No. 897,143. PATENTED AUG. 25, 1908.
S. H. PRESTON.
COMPOUND VEHICLE AXLE.
APPLICATION FILED APR. 30, 1908.
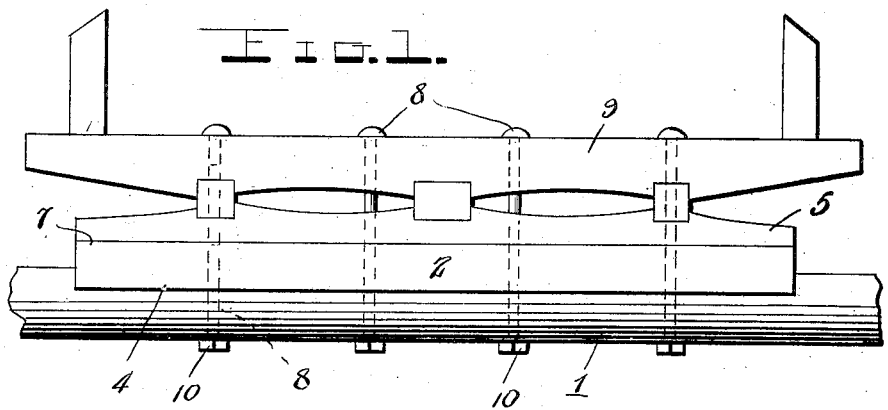
 
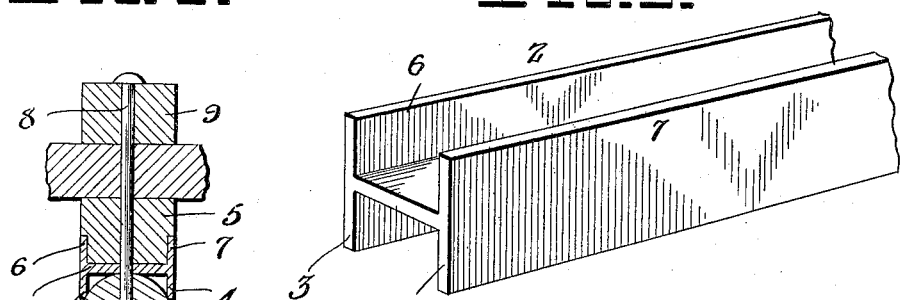
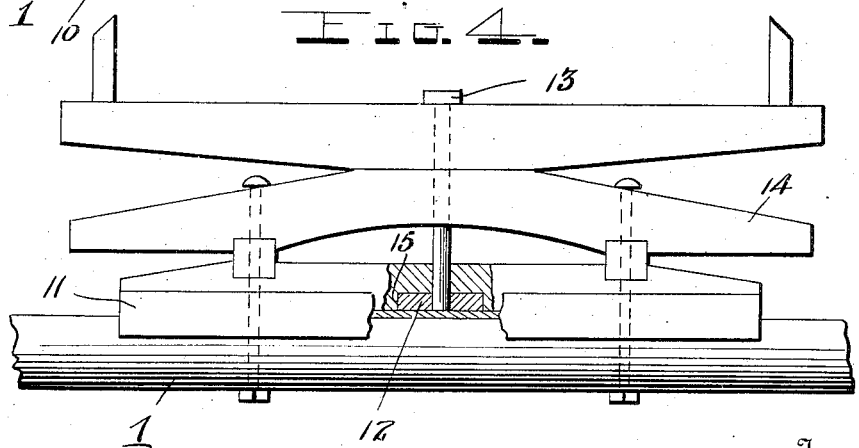
Witnesses
Chas. L. Griesbauer.
C. H. Griesbauer.
Inventor
S. H. Preston
By H. R. Williams & Co.
Attorneys

UNITED STATES PATENT OFFICE.

SYLVESTER H. PRESTON, OF NEW CASTLE, PENNSYLVANIA.

COMPOUND VEHICLE-AXLE.

No. 897,143.  Specification of Letters Patent.  Patented Aug. 25, 1908.

Application filed April 30, 1908. Serial No. 430,133.

*To all whom it may concern:*

Be it known that I, SYLVESTER H. PRESTON, a citizen of the United States, residing at New Castle, in the county of Lawrence and State of Pennsylvania, have invented certain new and useful Improvements in Compound Vehicle-Axles; and I do declare the following to be a full, clear, and exact description of the invention, such as will enable others skilled in the art to which it appertains to make and use the same.

This invention relates to an improved compound vehicle axle and the object of the invention is to provide a simply constructed, light, strong and efficient device of this character.

With this and other objects in view, the invention consists of certain novel features of construction, combination and arrangement of parts, as will be more fully described and particularly pointed out in the appended claims.

In the accompanying drawings, Figure 1 represents a rear elevation of a hind axle constructed in accordance with this invention, and having a bolster connected therewith; Fig. 2 is a transverse section thereof; Fig. 3 is a perspective view of the bracing channel member detached; Fig. 4 is a rear elevation with parts broken out showing a front axle constructed in accordance with this invention.

In the embodiment illustrated, an axle tree 1 is shown of ordinary construction having mounted thereon a double channel or T bar 2, the flanges 3 and 4 of said bar fitting down on opposite sides of the axle as shown in Fig. 2. A wooden stock 5 fits in the other groove or channel of said bar between the upwardly extending flanges 6 and 7. This wooden stock 5, channel bar 2, and axle 1 are preferably made of the same diameter, as shown in Fig. 2 to present the appearance of a single piece. This double channel bar 2 and the stock 5 may be secured together in any desired manner, preferably by means of bolts as 8 which extend transversely through the upper bolster 9 through the lower bolster or stock 5, through the channel bar 4 and through the axle 1 and are provided with nuts as 10 for binding these parts together. This double channel bar being arranged longitudinally of the axle with the flanges thereof engaging the opposite sides of the bolster and the axle through the greater portion of its length, relieves the axle from strain and binds the members firmly together comparatively no strain or pressure being exerted on the bolts 8 which connect the parts.

The front axle shown in Fig. 4, is constructed similarly to the axle just described which is the hind axle except that the channel bar 11 is preferably provided with a square block of metal as 12 secured thereto in any suitable manner and adapted to fill the space between the upwardly projecting flanges and through which the king bolt 13 is designed to pass, the end of said bolt terminating within this block, perforation of the axle proper is thereby avoided and the lower bolster 14 of the front axle is provided on its lower face with a recess 15 to fit over the block 12 carried by the channel bar.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:

1. In a vehicle axle, the combination with an axle tree of a double T bar arranged to fit longitudinally on said tree with the flanges at one side thereof embracing and closely hugging the sides of the tree 2. In a vehicle axle, the combination with an axle tree, of a bracing member mounted thereon and comprising a double T bar arranged to fit longitudinally on said tree with the flanges embracing and closely hugging the sides of the tree and with its other flanges projecting upwardly to receive a bolster.

In testimony whereof I have hereunto set my hand in presence of two subscribing witnesses.

SYLVESTER H. PRESTON.

Witnesses:
J. H. PRESTON,
SAMUEL R. BROWN.